(12) United States Patent
Smith et al.

(10) Patent No.: US 7,987,136 B2
(45) Date of Patent: Jul. 26, 2011

(54) SYSTEMS AND METHODS FOR PROVIDING CUSTOMIZED FINANCIAL PRODUCTS AND FOR HEDGING RISK EXPOSURE

(75) Inventors: Daniel J. Smith, Madrid (ES); Sergio Chalbaud, Algorta (ES); Jose Manuel Llado, Madrid (ES)

(73) Assignee: Ideon Financial Solutions, S.L. (ES)

( * ) Notice: Subject to any disclaimer, the term of this patent is extended or adjusted under 35 U.S.C. 154(b) by 0 days.

(21) Appl. No.: 12/752,272

(22) Filed: Apr. 1, 2010

(65) Prior Publication Data

US 2011/0125669 A1    May 26, 2011

Related U.S. Application Data

(60) Provisional application No. 61/263,954, filed on Nov. 24, 2009.

(51) Int. Cl.
*G06Q 40/00* (2006.01)

(52) U.S. Cl. .......................... 705/37; 705/35; 705/36 R

(58) Field of Classification Search ................ 705/35, 705/36 R, 37
See application file for complete search history.

(56) References Cited

U.S. PATENT DOCUMENTS

| | | | |
|---|---|---|---|
| 7,089,202 | B1 | 8/2006 | McNamar et al. |
| 7,415,432 | B1* | 8/2008 | Gianakouros et al. ...... 705/36 R |
| 2001/0042036 | A1 | 11/2001 | Sanders |
| 2003/0088489 | A1 | 5/2003 | Peters et al. |
| 2005/0027638 | A1 | 2/2005 | Ng et al. |
| 2005/0187851 | A1* | 8/2005 | Sant ............................... 705/36 |
| 2006/0271465 | A1 | 11/2006 | McNamar et al. |
| 2007/0055602 | A1 | 3/2007 | Mohn |
| 2007/0239582 | A1 | 10/2007 | Tyson |
| 2009/0292649 | A1 | 11/2009 | Somech et al. |
| 2009/0319438 | A1 | 12/2009 | Jain |

FOREIGN PATENT DOCUMENTS

| | | |
|---|---|---|
| WO | WO 2007/021697 A2 | 2/2007 |
| WO | WO 2009/134817 A1 | 11/2009 |

OTHER PUBLICATIONS

Brown C. Financial engineering, consumer credit, and the stability of effective demand. Journal of Post Keynesian Economics [serial online]. Spring2007 2007;29(3):427-453. Available from: Business Source Complete, Ipswich, MA. Accessed Feb. 11, 2011.*

Insights, Defining Portable Alpha Strategies, JPMorgan Chase & Co. Nov. 2006 doc ID# IM_INSGTS_HF_1206.*

(Continued)

*Primary Examiner* — Mary Cheung
*Assistant Examiner* — Daniel L Greene
(74) *Attorney, Agent, or Firm* — DLA Piper LLP (US)

(57) ABSTRACT

Systems and methods for creating and managing user-customized financial products are operable to create a plurality of user-customized financial products, each a discrete financial instrument comprising a baseline financial product comprised of a combination of one or more underlying product components, where each underlying product components comprises one or more user-customized component parameters. Once created, the plurality of user-customized financial products are disaggregated into their respective underlying product components and associated component values. Next, all component values associated with each of the underlying product components are aggregated, and at least one back-to-back hedging transaction for the aggregated component value of at least one of the underlying product components is executed.

20 Claims, 5 Drawing Sheets

OTHER PUBLICATIONS

Choice Savings, Powering the savings revolution, IDEON Financial Solutions, avialbe online @ https://www.bai.org/retaildelivery/expo/new-product-showcase.aspx, last accessed Feb. 11, 2011.* ideonfs.com/en/, available @ http://web.archive.org/web/20080629060836/http://ideonfs.com/en/ accessed Feb. 9, 2011.*

Acerca de Ideon (About Ideon) available @ http://web.archive.org/web/20080529234020/http://ideonfs.com/en/acerca/ accessed Feb. 9, 2011.* lineas, avalable @ http://web.archive.org/web/20080705023107/ideonfs.com/en/lineas/ accessed Feb. 9, 2011.*

Privacy statement, available @ http://web.archive.org/web/20080530081012/ideonfs.com/en/privacidad/ accessed Feb. 9, 2011.*

Search Results Wayback machine available @ http://web.archive.org/web/*sr_1nr_30/http://ideonfs.com/* accessed Feb. 9, 2011.*

Ma et al. Interactive design system for Financial Engineering Product Based on Customer Information. Information Technology and Applications, 2009. IFITA '09. International Forum, May 15-17, 2009, pp. 544-546.*

Brown, Carolyn M., Prioleau, Patrick, *On-Line Personal Investing* Black Enterprise. New York: Oct. 1992, vol. 23, Iss. 3; p. 37, 2 pages.

* cited by examiner

SYSTEMS AND METHODS FOR PROVIDING CUSTOMIZED FINANCIAL PRODUCTS AND FOR HEDGING RISK EXPOSURE

RELATED APPLICATION

This application claims priority to U.S. Provisional Patent Application No. 61/263,954, filed Nov. 24, 2009, the entire contents of which are incorporated by reference.

FIELD OF INVENTION

The present disclosure relates generally to creating and managing user-customized financial products. More specifically, the present disclosure provides systems and methods for efficiently creating and managing user-customized financial products without significant restrictions on the minimum transaction value and/or levels of customization.

BACKGROUND

Financial institutions are currently unable to build, offer, process, and/or manage large quantities of user-customized financial products (e.g., customized certificates of deposit). This is due, in part, to the considerable expense associated with creating customized products, and the limitations of existing financial systems.

Moreover, even those systems that do offer products having differing product characteristics, do not provide the flexibility to allow customers to truly customize their products according to their specific needs and desires. Instead, these systems operate on the premise of offering static product catalogues. That is, they offer different products, each having differing product characteristics (e.g., traditional certificate of deposits, each with differing maturities and yields). Once these static products are defined, however, none of the products' characteristics may be modified or adjusted. In this regard, conventional systems treat financial products as closed entities having defined and unchangeable characteristics. Indeed, if changes to a particular product characteristic is desired, a new financial product must be defined to include the changed characteristic. The foregoing may be illustrated by the following example.

Suppose a financial institution offers a catalogue with two different products:

a. Product X: a 3-year certificate of deposit (CD) that pays a fixed annual coupon of 3%; and b. Product Y: a 3-year CD that pays a variable coupon depending on the performance of the Standard and Poors (S&P) Index. The variable coupon may be defined as 50% of the positive performance of the S&P Index.

Using conventional systems, if a customer desired a product that combined certain characteristics of both Product X and Product Y, such as a 3-year CD paying a fixed coupon of 1% and a variable coupon based on the performance of the S&P Index, an entirely new product, say Product XY, would have to be defined to reflect the desired characteristics.

Notably, there could be an infinite number of combinations of Product X and Product Y that could be chosen by different customers depending on their particular risk profile and liquidity needs. With existing systems and technology, the financial institution would be forced to establish and offer each individual combination as a new, individual product structure. As will be appreciated by those of skill in the art, this can consume considerable time, effort and expense. Given these limitations, financial institutions simply do not offer such customization to their customers. Instead, financial institutions continue offering fixed or static product catalogues, which means that a customer may choose between the existing products in the product catalogue. However, customers are unable to customize any of the products to meet their specific needs.

Notwithstanding the foregoing, certain high net-worth customers may request that their financial institution prepare and define a financial product that includes a particular combination of characteristics. If such a product is not included in the institution's catalogue, the institution will have to separately define, create, hedge, and manage this product. Indeed, as explained above, existing systems are incapable of modifying existing products to reflect modified or adjusted product characteristics. As a result, the financial institution will have to go through the time and expense of defining an entirely new product, one that reflects the desired characteristics of its customer. Moreover, if another customer desired a slightly different product (e.g., one that includes slight modifications to an existing product's characteristics), another entirely new financial product would have to be defined, created, hedged, and managed. As a result, only customers willing to deposit significant amounts of money with their institution (i.e., to cover the expense of defining a new product) may have the privilege of requesting such a product.

Accordingly, it would be desirable to have systems and methods for creating user-customized financial products in an economically viable manner, without significant restrictions placed on the minimum transaction value and/or on the level of user customization associated therewith. Moreover, it would be desirable to have systems and methods for pricing, hedging, and managing user-customized financial products, through their entire life-cycle, in an economically efficient and viable manner.

SUMMARY

The present disclosure relates generally to systems and methods for creating and managing user-customized financial products. According to an exemplary embodiment, a plurality of user-customized financial products, each comprising a baseline financial product comprised of a combination of one or more underlying product components, where each underlying product components comprises one or more user-customized component parameters, may be created using one or more computing devices. Once created, the plurality of user-customized financial products may be disaggregated into their respective underlying product components and associated component values. Next, all component values associated with each of the underlying product components may be aggregated, and at least one back-to-back hedging transaction for the aggregated component value of at least one of the underlying product components may be executed.

In another exemplary embodiment, user-customized financial products may be created by receiving in a computing device market data relating to one or more underlying product components. Then, based on the market data, the one or more underlying product components may be combined to create at least one baseline financial product. The at least one baseline financial product may then be customized by dynamically adjusting one or more parameters associated with at least one of the underlying product components, wherein adjusting a first parameter associated with at least one of the underlying product components automatically adjusts at least one other underlying product component parameter.

In yet another exemplary embodiment, post hedging operations and management may include receiving settlement details in response to executing at least one hedging transaction. Then, based on the settlement details, a component settlement amount may be assigned to each underlying product component that comprises at least one baseline financial product. These component settlement amount(s) may then be aggregated to determine a baseline product settlement amount. This baseline product settlement amount may then be proportionally disaggregated across each user-customized financial product created therefrom to determine, for each user-customized financial product, a user-settlement amount. Once the user-settlement amount(s) are determined, they may be automatically transmitting to one or more financial entities, where they may be applied to a corresponding user-customized financial product.

An exemplary system according to the present disclosure includes one or more computing devices in communication with each other, each comprising a memory for storing instructions and at least one processor for executing said instructions. In one embodiment, at least one of the computing devices executes instructions that causes the system to: create a plurality of user-customized financial products; disaggregate each of the plurality of user-customized financial products into their respective underlying product components and associated component values; aggregate all component values associated with each of the underlying product components; and automatically execute at least one back-to-back hedging transaction for the aggregated component value of at least one of the underlying product components.

In another embodiment, the exemplary system may further comprise a market database in communication with at least one of the computing devices. This market database may provide real-time market data relating to one or more underlying product components.

In yet another embodiment, the exemplary system may further comprise a display and instructions that when executed cause the system to automatically calculate a projected maturity value associated with each user-customized financial product. The system may also dynamically display a graphical representation of the projected maturity value that changes as one or more component parameters are adjusted. Further, the system may automatically prepare and display a summary report reflecting all adjusted parameters associated with each user-customized financial product. Once each adjusted parameter is confirmed, the system may automatically issue one or more user-customized financial product(s).

DETAILED DESCRIPTION

Figure 1:
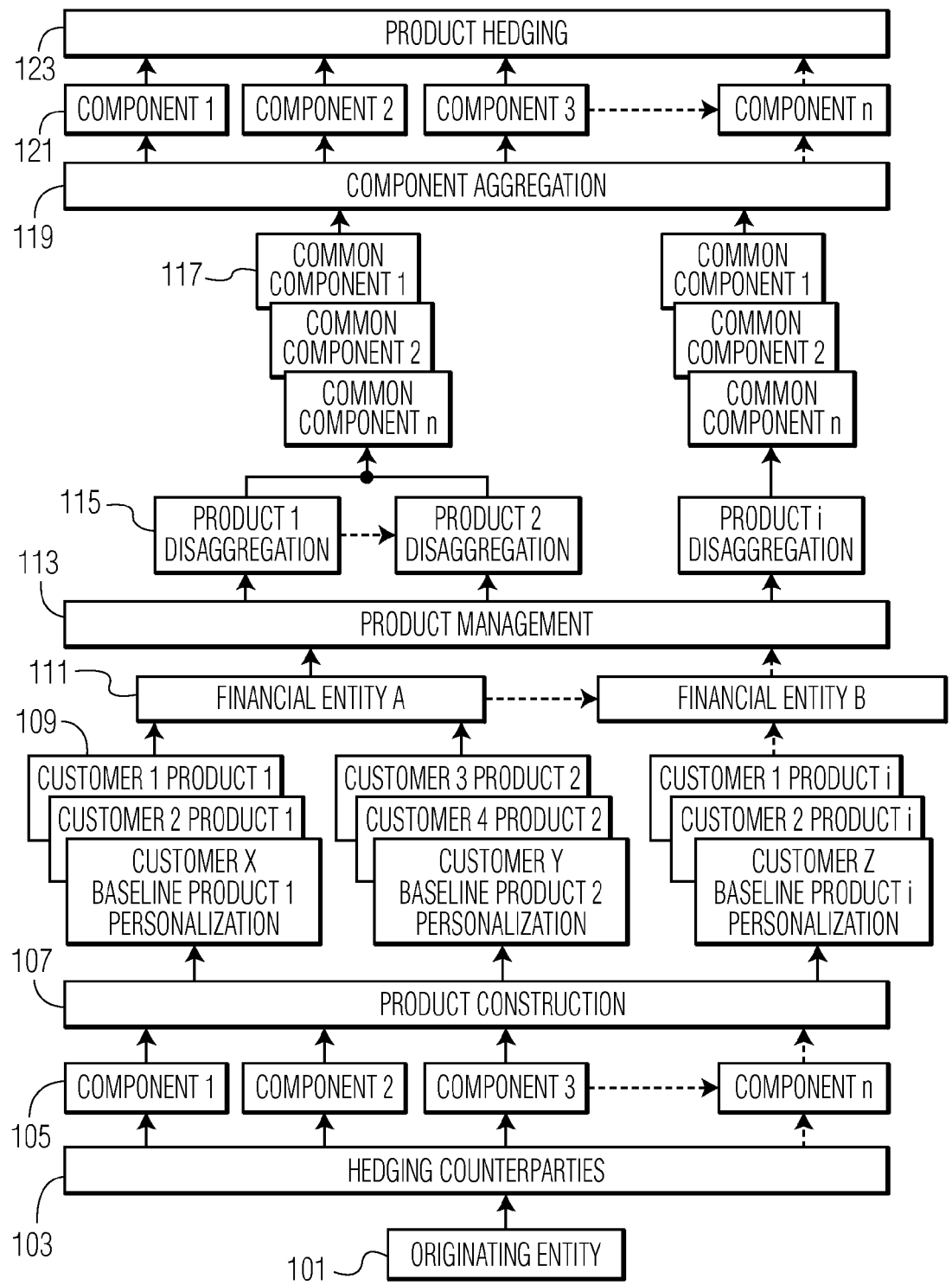
FIG. 1 shows an diagram illustrating product creation, user-customization, management, and hedging operations according to an exemplary embodiment of the present disclosure.

It will be appreciated that the following description is intended to refer to specific examples of structure selected for illustration in the drawings and is not intended to define or limit the disclosure, other than in the appended claims.

The present disclosure provides methods and systems for creating user-customized financial products in an economically viable manner, and without significant restrictions placed on the minimum transaction value and/or on the level of user customization associated therewith. As a result, customers of all sizes, from individuals to large institutional customers, are able to purchase and tailor these financial products according to their individual preferences and needs.

In addition, the present disclosure provides for the aggregate pricing, hedging, and overall management of user-customized financial products. Importantly, this is in sharp contrast to conventional systems and methods that are required to price and hedge such customized instruments on an individualized basis (i.e., one-by-one). The present disclosure, on the other hand, provides for the pricing and hedging of any number of user-customized financial products, having any number of permutations, simultaneously. As a result, financial entities desiring to offer such products, whether at one branch or across multiple branches, may now do so in an efficient and economically viable manner.

In summary, a customizable financial product (i.e., a "baseline financial product" or "baseline product") in accordance with the present disclosure may be created by combining one or more underlying product components. Underlying product components may include, for example, derivatives, interest rate swaps, maturity swaps, options, annuities, or any other financial instrument. Each of these underlying product components comprises certain elements or features that define the particular properties and behaviors thereof. Thus, once combined, any resulting baseline product will also exhibit the particular elements or features associated with each of its underlying components.

Component elements according to the present disclosure may be classified as "tenor" elements or as "product" elements, for example, with tenor elements being those that are present, and thus common, across any baseline financial product, and product elements being those that are specific to a particular baseline product. Examples of "tenor" elements may include, without limit: present value of money, interest rate factor, capital guarantee limits, periodic payment limits, sum of interest payment values, payment frequency, and number of payments; while examples of "product" elements include, without limit: tenor, base parameter, dynamic texts specific to a product's characteristic(s), return tables, and conditional return values.

The number and type of underlying product components used to create any particular baseline product may depend, at least in part, on the type of features an offering entity (e.g., a bank, a broker, or any other financial entity) wishes to offer its customers. Importantly, however, all such underlying components will share a common or compatible financial profile. For purposes of this disclosure, sharing a common or compatible financial profile refers to the sharing of a same start and end date. In particular, with respect to any given underlying product component, all tenor elements of a given tenor, as well as all product elements associated to that tenor, will have the same start and end dates as the tenor and product elements of any other underlying component combined to create a particular baseline product. Sharing common or compatible financial profiles across multiple underlying product components achieves at least two goals: 1) it permits such product components to be combined and incorporated into baseline product(s); and 2) it facilitates certain aggregation functions to be enacted at anytime throughout the lifecycle of a given customized financial product. As will be further discussed below, creating baseline products from underlying components having common financial profiles facilitates aggregate pricing, hedging, and downstream mass management of any number of user-customized financial products, across any number of offering entities.

Once a baseline financial product has been created, it may be offered to customers who may then adjust or customize certain of the product's parameters according to their respective desires and needs. By adjusting the product's parameters, customers are effectively personalizing a base parameter (initially set to a predetermined level) associated with each of the product's underlying components, and consequently, the value of the components' elements. These base parameters may be initially set to any desired level such as 10%, 50%, or 100%. In a given baseline product, for example, a base parameter of one of the product's components may be set to 100%, while another component's base parameter may be set to 75%. In either case, these base parameters may be changed or personalized as a customer adjusts one or more product parameters. Examples of customizable parameters may include, without limit, an initial deposit amount, a maturity term, a minimum guaranteed return, liquidity (e.g., a number and frequency of periodic cash payouts), a minimum annual percentage yield (APY) rate, a source of conditional returns, participation in conditional returns, etc.

Once a customer has made all desired parameter adjustments, a personalized financial product that reflects that customer's particular desires and/or needs automatically issues. Contrary to conventional systems, each customer's personalized financial product is not necessarily priced, hedged, or managed individually. To the contrary, the present disclosure provides for collectively pricing, hedging, and downstream management of any number of user-customized financial products having any number of permutations.

Turning now to FIG. 1, a flow diagram showing an exemplary embodiment 100 of the present disclosure is shown. The exemplary embodiment 100 illustrates product creation, user-customization, and management-hedging operations according to the present disclosure. Each of these operations is discussed in further detail below.

As a starting point, an originating entity 101 (e.g., a financial institution, a bank, a broker, etc.) desiring to create and offer one or more baseline financial product(s) seeks valuation data from one or more hedging counterparties 103. In this respect, the originating entity 101 requests details for one or more underlying product component(s) (or simply "component(s)") that may be used to construct the one or more baseline products. In response, the hedging counterparties 103 provide pricing quotations and/or other market data (collectively, "pricing information") on a component by component 105 basis. Optionally, pricing information may be provided continuously, on a real-time basis, to allow the originating entity 101 to determine when, and at what volumes, to purchase the underlying components.

As pricing information is received, it is assigned to the respective components 105, and any component elements associated therewith are automatically updated to reflect the same. Once updated with the pricing information, the originating entity 101 may determine a pricing structure (i.e., the price the originating entity will itself have to pay, not the price offered to customers) for any baseline product it ultimately creates.

Once all pricing information has been received, and all component elements have been updated, the originating entity 101 (via the entity's product manager, for example) may select and define different component combinations to create one or more baseline financial products 107. Importantly, any such combination of components 105 will reflect a common financial profile. As noted above, having a common financial profile is what facilitates the aggregate (customer) pricing, hedging, and downstream management of multiple user-customized products, reflecting any number of product permutations.

Once constructed, the baseline financial product 107 may be offered to any number of customers for personalization 109. As previously noted, personalization involves adjusting or customizing certain of the baseline product's 107 parameters according to the individual desires and/or needs of customers. Adjusting the product's 107 parameters automatically adjusts a base parameter (initially set to 100%) associated with each of the product's 107 underlying components 105, and consequently, the value of the components' elements.

Customers may access the baseline financial product 107 remotely, via a wired or wireless communication network (e.g., the Internet, telecommunications network, etc.), in person at the site of a financial entity or broker, and/or via any other appropriate means or channels. In one embodiment, a customer may access the baseline financial product remotely via a personal computer, a mobile telephone, or any other mobile communications device. In another embodiment, the customer may enter a financial institution and access the baseline financial product 107 via an on-site computing device having a display screen and means for interacting with said computing device. Using the interactive means, the customer (and/or an employee of the financial entity) may adjust (e.g., increase or decrease) the values associated with one or more of the adjustable parameters. As the customer is making the adjustments, the computing device may optionally display a graphical illustration of the baseline financial product 107 as-modified to show the effects of each of the customer's adjustments. Once the customer has made all desired adjustments, the computing device may confirm the customer's selections, and automatically issue the user-customized (or personalized) financial product/contract 109.

As each user-customized product 109 is issued, the issuing financial entity 111 may automatically perform all underlying calculations 113 relating to the elements and product components 105 to yield the desired product structure, and to determine deposit requirements, margin, accumulated component volumes, and costs of purchasing said component volumes. In this respect, the financial entity 111 may keep a running tally of the total volume of underlying components needed to fulfill all of the personalized products 109 across one or more financial entities 111. Moreover, each financial entity 111 may optionally establish predetermined parameters that when reached, automatically trigger a hedging transaction 123 to purchase an aggregate volume of one or more of the underlying product components 105. Such parameters may relate to aggregate component volumes (across one or more financial products and/or across one or more financial entities) and/or market prices. As will be appreciated by those of skill in the art, purchasing large volumes of product components 105 will likely yield a lower per-unit cost of said components 105.

Concurrent with the aforementioned calculations 113, the financial entity 111 may perform certain disaggregation 115 and aggregation 119 functions to facilitate hedging transactions 123, as discussed above. During a disaggregation function 115, user-customized financial products 109 are broken down into their respective components 105, and each components' details and values (as adjusted by each customer) 117 are captured. Such disaggregation 115 may occur across any number of customized products 109 (whether or not derived from one or more different baseline product structures), and across any number of financial entities 111. Thus, for example, if a financial institution 111 issues a series of user-customized products comprised of four (4) underlying product components (e.g., A, B, C, and D), each user-customized "A-B-C-D" product may be disaggregated 115 or separated into its respective A, B, C, and D components, and each components' details and values 117 may then be captured. Similarly, if the same financial institution (or another institution) 111 issues another series of user-customized products comprised of a different set of underlying components (e.g., A, B, D, and E), these user-customized "A-B-C-E" products may also be disaggregated 115 into their respective A, B, D, and E component details and values.

Once user-customized products 109 have been disaggregated 115, and the details and values of each underlying product component have been captured 117, all such component details and values may then be aggregated 119, on a component-by-component basis, to determine an aggregate or total value for each product component 121. Like disaggregation 115, aggregation 119 may occur across any number of customized products 109, and across any number of financial institutions 111. Thus, continuing with the example above, suppose two (2) customized "A-B-C-D" products and one (1) customized "A-B-C-E" product issued by a first financial entity, and on one (1) customized "A-B-E-F" product issued by a second financial entity are disaggregated 115 as discussed above. Further, suppose that the following individual component values are captured:

i. A=1, B=2, C=2, and D=4;
  ii. A=2, B=2, C=1, and D=4;
  iii. A=1, B=2, C=3, and E=4; and
  iv. A=1, B=2, E=4, and F=1.

Aggregating 119 the component values, on a component-by-component basis, may yield the following underlying component equivalents: A=5, B=8, C=6, D=8, E=8, and F=1. As will be discussed further below, these aggregated component values may then be utilized to execute one or more hedging transactions 123.

Following aggregation of component values 119, a hedging transaction (e.g., back-to-back hedge) 123 may be executed with the hedging counterparties 103, on a component-by-component basis, for the aggregated component values 121. This hedging transaction 123 may be triggered manually or automatically in response to certain criteria being met (e.g., when the volume/price of a certain product component reaches a predetermined level). As will be understood to those in the art, the hedging transaction 123 may be utilized by the financial entities 111 to hedge their respective commitments (i.e., their risk positions) to their customers. Indeed, the financial entities 111, by virtue of issuing user-customized financial products 109, have made binding commitments to their customers. In order to hedge these commitments, the financial entities 111 may purchase the necessary product components from the hedging counterparties 103 to satisfy the user-customized products 109. Contrary to conventional systems that purchase individualized component volumes on a product-by-product basis, the present disclosure enables financial entities 111 to purchase (thereby hedge against) larger/aggregate volumes of components that comprise multiple financial products. As a result, the financial entities 111 are able to garner better prices, and thus, realize larger margins.

Figure 2:
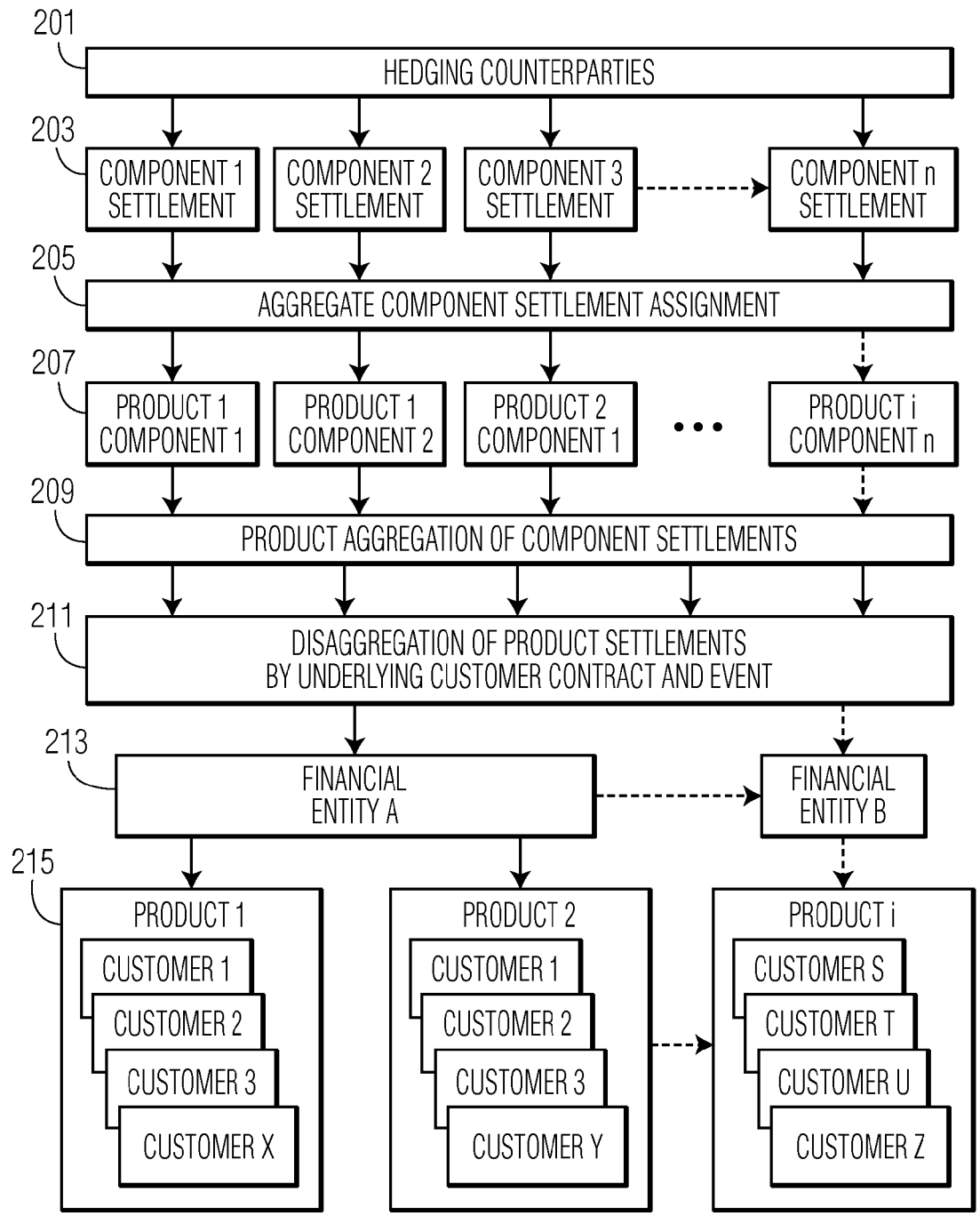
FIG. 2 shows exemplary post-hedging operations in accordance with an exemplary embodiment of the present disclosure.

Turning now to FIG. 2, an exemplary embodiment 200 illustrating certain post-hedging operations in accordance with the present disclosure is shown. Notably, the post-hedging operations shown in FIG. 2 may be conducted following the back-to-back hedging transactions 123 described with respect to FIG. 1, or in conjunction with any other type of hedging transaction or processes utilized by a hedging entity.

Thus, once one or more hedging transactions have been consummated, each for an aggregate volume of a product component, the one or more hedging counterparties 201 involved in such transactions may supply settlement details (e.g., including an aggregate settlement amount) for each component 203 to the entities that issued user-customized products comprising such product components. Notably, the aforementioned hedging transactions are not limited to one per product component. To the contrary, any number of hedging transactions may be consummated to satisfy the full volume of any given product component.

The settlement details 203 provided by the hedging counterparties 201 may be utilized to assign a component settlement amount 205, for an aggregate component volume, to each product component. These component settlement amounts 205 may then be assigned to the various baseline financial products utilizing said components 207. Thus, if a particular baseline financial product were comprised of components A-B-C-D, then the component settlement amount for each of A, B, C, and D would be assigned to baseline financial product A-B-C-D, for example.

Once a component settlement amount 205 for each of a product's components has been assigned 207, they are aggregated to determine an aggregate product settlement amount 209. Thus, continuing with the foregoing example, once a component settlement amount for each of A, B, C, and D are assigned to baseline product A-B-C-D, these settlement amounts may be aggregated to determine an aggregate settlement amount for product A-B-C-D.

Next, each baseline financial product's aggregate settlement amount may be proportionally disaggregated across all user-customized financial products created therefrom to yield a customer settlement amount for each customized product 211. Thus, if baseline product A-B-C-D were used to issue user-customized products: a) 2A-2B-2C-2D and b) 4A-4B-4C-4D, for example, then twice as much of the aggregate settlement amount 209 may be apportioned to customized product b. than to customized product a., meaning that product b. may have a customer settlement amount that is twice that of product a. Notably, the aggregate settlement amount 209 may be apportioned across user-customized products according to any desired method or scheme.

Once the aggregate settlement amount 209 is disaggregated 211, the resulting customer settlement amounts are provided to the financial entities issuing the user-customized products 213, where said customer settlement amounts may be applied to the appropriate customized financial products 215. To illustrate, if Bank 1 issues multiple customized products stemming from baseline product A-B-C-D, then Bank 1 will receive a customer settlement amount for each of the customized A-B-C-D products it issues. Once received, Bank 1 will apply these settlement amounts to the appropriate customized product.

Figure 3:
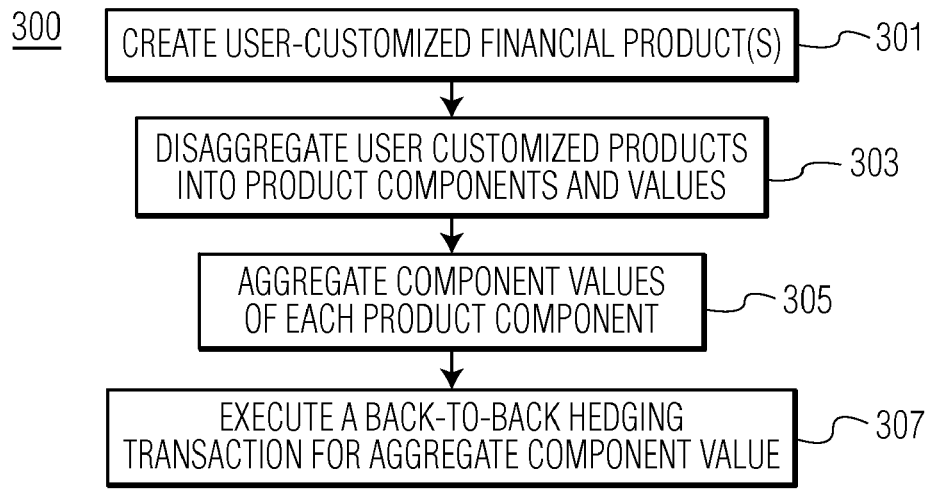
FIG. 3 shows an exemplary method of managing and hedging a plurality of user-customized financial products via a computing device/system.

Turning now to FIG. 3, an exemplary method 300 of managing and hedging a plurality of user-customized financial products via a computing device/system is shown. According to the method 300, a plurality of user-customized financial products, each comprising a baseline financial product which itself comprises a combination of one or more underlying product components, are created 301. These customized products may include one or more of a certificates of deposit, a market linked certificate of deposit, or any other similar instrument. As will be appreciated by those of skill in the art, market linked certificates of deposit are linked to stock or other types of market indices. As a result, they have an opportunity to yield a higher return than a standard certificate of deposit having a fixed return rate.

The baseline financial products used to create the customized products may all comprise the same combination of product components, or they may comprise one or more different combinations of product components. These underlying product components may be characterized as any one of a derivative, interest rate swap, maturity swaps, options, annuities, or any other financial instrument, and each may comprise one or more adjustable component parameters. Once adjusted, these component parameters will define the product structure and behavior of each of said customized financial products. Examples of such parameters may include, for example, an initial deposit amount, a maturity term, minimum guaranteed return, number and frequency of periodic cash payouts, minimum annual percentage yield (APY) rate, a source of conditional returns, and participation in conditional returns.

Notably, the user-customized financial products may be created 301 manually (using paper documentation) and/or electronically, using a computing device and/or computing system that may be networked via a wired or wireless communication network. Moreover, the plurality of customized products may be created 301 at a single financial entity (e.g., bank, broker, investment firm, etc.), across multiple financial entities in communication with one another, and/or remotely via a customer's personal computing device. In one embodiment, the user-customized financial products may be created according to the exemplary method illustrated in FIG. 4.

Figure 4:
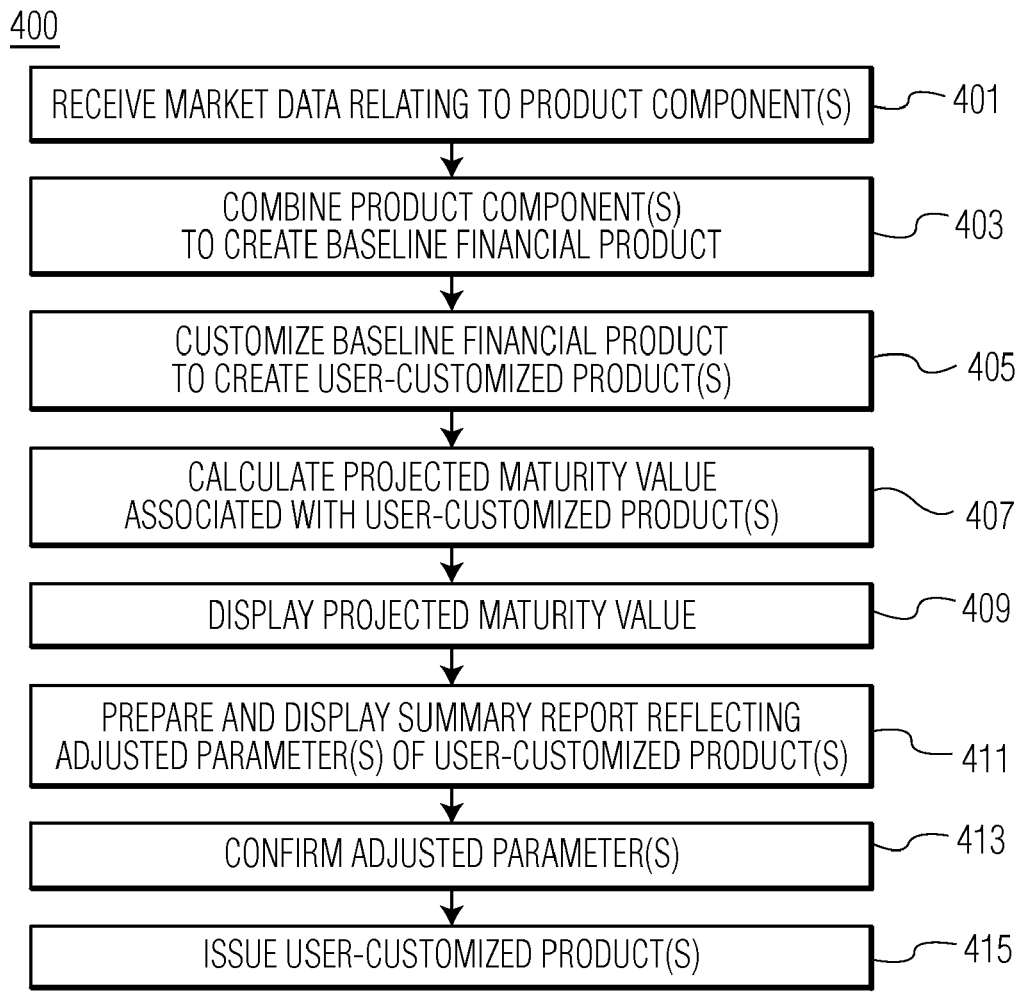
FIG. 4 shows an exemplary method of creating at least one user-customized financial product.

Turning briefly to FIG. 4, an exemplary method 400 of creating at least one user-customized financial product is shown. According to the method 400, market data (which may include pricing quotations, for example) relating to one or more product components is received into a computing device 401. This computing device may pertain to a single financial entity, or it may be centrally located and in communication with a network of financial entities. Once this market data is received 401, product managers, for example, may use it to select and define different component combinations. At least one such combination of underlying product components may then be used to create at least one baseline financial product that will yield a desired margin, while at the same time offering the type of features and pricing structure that is both economically viable and attractive to customers 403.

Once at least one baseline product is created 403, it may be offered to one or more customers for customization. The customers may then customize the baseline product(s), according to their respective needs and desires, by dynamically adjusting one or more component parameters 405. Examples of such parameters may include, for example, initial deposit amount, a maturity term, APY, and others. As the parameters are adjusted 405, certain calculations are automatically executed to adjust one or more of component features or elements. In some cases, the parameters may be interrelated or linked such that adjustment of one parameter automatically adjusts at least one other parameter. Collectively, these parameter adjustments define the ultimate product structure and behavior of each customized product.

Optionally, during the customizing step 405, a projected maturity value associated with each user-customized financial product may automatically be calculated 407 and displayed 409 to a customer and/or financial entity. This projected maturity value may comprise a minimum guaranteed value and a conditional return value, where the conditional return value is linked to a market index (e.g., a stock index), for example. In one embodiment, the display may provide a graphical representation of this projected maturity value that changes as one or more of the product component parameters are adjusted.

A further option may include preparing (manually or automatically) and displaying a summary report reflecting all parameter adjustments associated with a user-customized financial product 411. This summary report may be displayed via a computing display screen, or it may be produced as a physical document. In either case, the report will provide parameter adjustment information, as well as information summarizing the product structure and details of each user-customized product. Using this report, a customer may confirm that all parameters have been adjusted, and that the resulting product has been customized, as desired and expected 413. Once all parameter adjustments have been confirmed 413, the user-customized product(s) may be issued 415.

Returning again to FIG. 3, once the plurality of customized products are created 301, the computing device disaggregates each of the plurality of user-customized financial products into their respective underlying product components and associated component values 303. In other words, each customized product is broken down into its respective product components, and their respective component values are captured. To illustrate, if a user-customized product comprised components A-B-C-D, said product may be broken down into its respective A, B, C, and D components, and the values of each of A, B, C, and D would be captured.

Next, at step 305, all component values associated with each of the underlying product components are aggregated. That is, all component values for each particular component are summed or accumulated. Thus, for example, if two different customized products each comprises the component A, and following disaggregation 303 it was determined that the first product comprises a component-A value of 2 and the second product comprises a component-A value of 3, then the aggregation step 305 may yield an aggregate component value of 5 for component A.

Aggregating component values 305 in this manner is possible, in part, because each underlying component comprises one or more component elements (or characteristics/features) that define a financial profile that is common amongst other product components. These component elements not only define the characteristics and behaviors of their respective components, but they also define the characteristics and behaviors of any baseline product with which they are associated. In any given baseline product, its component elements may be associated and divided into two categories: tenor elements and product-specific elements. Example tenor elements may include, without limit, a present value of money, interest rate factor, capital guarantee limits, periodic payment limits, a sum of interest payment values, payment frequency, and number of payments. Example product-specific elements may include, without limit, a tenor, base parameter, dynamic texts, return tables, and conditional return values.

Categorizing each product's elements in this manner enables the aggregation of homogeneous elements (i.e., elements sharing the same start and end dates), and ultimately of product components. For that reason, the primary driver (amongst product elements) are the tenor elements. Indeed, for a given tenor, there may only be one set of tenor elements. There may, however, exist multiple financial products (each sharing the same set of tenor elements) comprising distinct product elements. These product elements, however, would nonetheless share the same start and end dates as the tenor elements with which they are associated.

As noted above, user-customized products may be created 301 at a single location (e.g., a single financial entity), or across multiple locations or entities. Similarly, the aforementioned disaggregation 303 and aggregation 305 steps may also occur at a single entity or across multiple entities (e.g., across multiple financial entities). In such an embodiment, multiple financial entities may be connected or linked to each other via a wired or wireless communication network. Accordingly, each entity may perform their respective disaggregation 303 and aggregation 305 steps, and then transmit the aggregation results to a central server, for example, where the aggregation results may be further aggregated. Alternatively, each financial entity may simply transmit the user-customized financial products (and data related thereto) to a central server where all disaggregation 303 and aggregation 305 operations may occur.

Once all component values associated with each underlying product component have been aggregated 305 (whether via a single entity or across multiple entities), at least one back-to-back hedging transaction for the aggregated component value of at least one of the underlying product components may be executed 307. This back-to-back transaction may occur automatically or manually.

As will be understood by those of skill in the art, this type of hedging transaction will enable financial entities to hedge their risk position for an aggregate volume of multiple permutations of individually customized financial products, as opposed to hedging individual products, on a product-by-product basis. As a result, the financial entities will be able to garner better prices, and thus, realize larger margins. Moreover, since the foregoing method 300 provides for the effective and efficient offering and management of any number of customized financial products, financial entities will be able to offer such user-customized products to customers of all sizes, with no significant restrictions on the minimum transaction value and/or on the levels of customization.

Following the execution of back-to-back hedging transaction(s), post-hedging operations may be enacted in order to satisfy or fulfill the commitments associated with each user-customized financial product. In one embodiment, the exemplary post-hedging operations illustrated in FIG. 5 may be enacted. It should be understood, however, that the present disclosure is not limited thereto.

Figure 5:
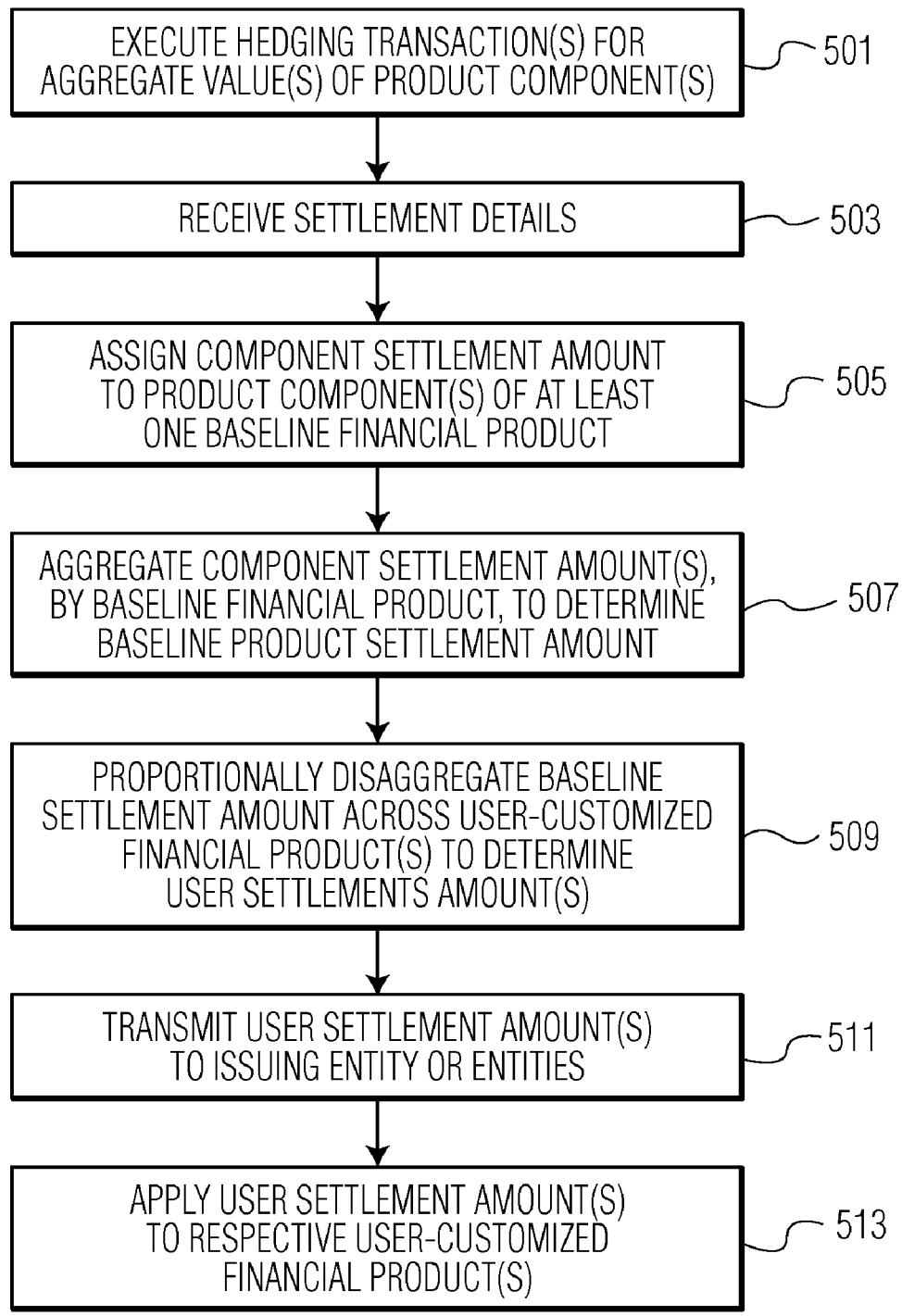
FIG. 5 shows an exemplary method performing certain post-hedging operations.

According to the exemplary method 500 of FIG. 5, once one or more hedging transactions (e.g., back-to-back) are executed for the aggregated component value of each underlying product component of at least one baseline financial product 501, whether executed automatically or manually, settlement details from the one or more hedging counterparties involved in said transactions may be received 503 at a single financial entity, at multiple financial entities, and/or at a centralized computing device networked to one or more financial entities.

Upon receiving the settlement details 503, a component settlement amount, based on the settlement details, is assigned to each of the underlying product components that comprise the at least one baseline financial product 505. Thus, if a particular baseline financial product is comprised of components X-Y-Z, the settlement details are used to assign a component settlement amount to each of components X, Y and Z.

Next, all component settlement amounts pertaining to each baseline financial product may be aggregated, by baseline product, to determine a baseline product settlement amount for each baseline financial product 507. Thus, continuing with the foregoing example, if a baseline product were comprised of components X, Y, and Z, then the component settlement amounts for each of X, Y, and Z may be aggregated to yield a baseline product settlement amount for baseline product X-Y-Z.

Each baseline product settlement amount may then be proportionally disaggregated across each user-customized financial product created from its corresponding baseline financial product to determine, for each user-customized financial product, a user-settlement amount 509. Thus, for example, the baseline product settlement amount for product X-Y-Z may be proportionally disaggregated across all user-customized products created from baseline product X-Y-Z.

Each user settlement amount may then be transmitted (manually or automatically) to the one or more financial entities issuing the respective customized products 511. Once received at their respective financial entities, each user-settlement amount may be applied (manually or automatically) to its corresponding user-customized financial product 513.

Figure 6:
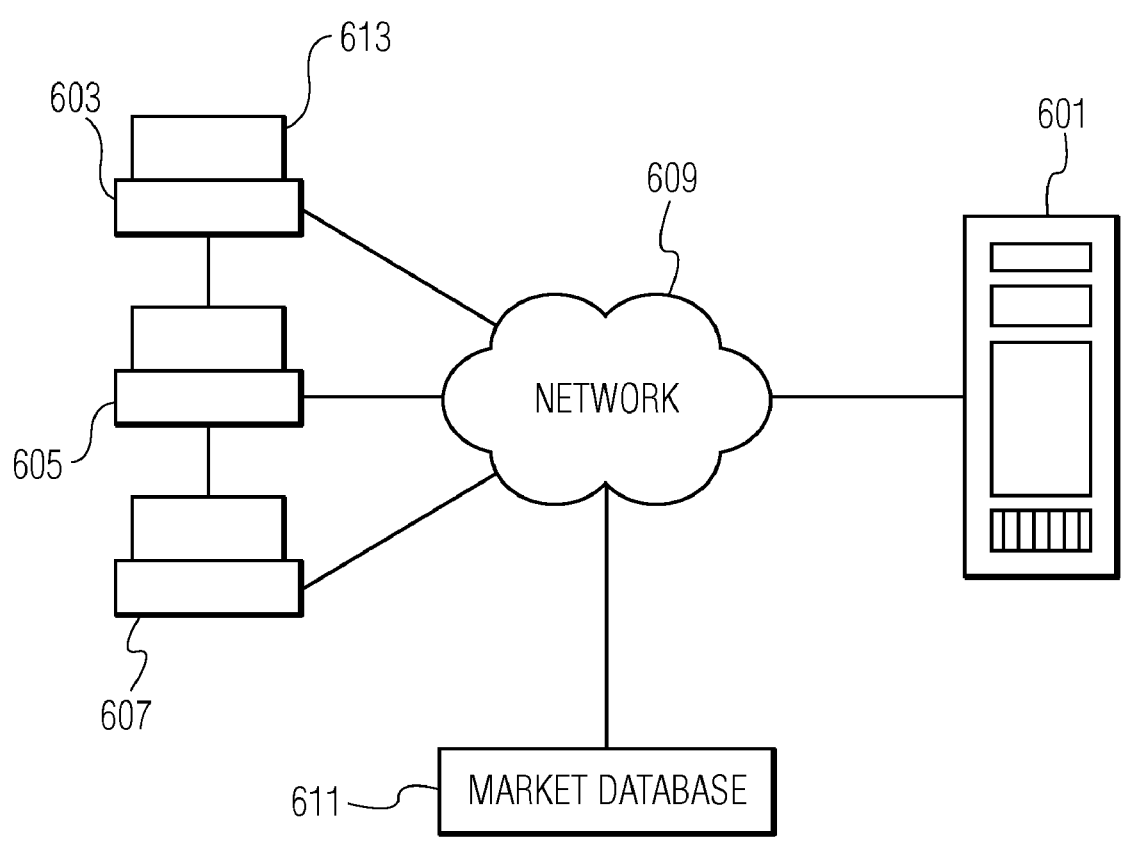
FIG. 6 shows an exemplary system for creating and managing user-customized financial products.

Turning now to FIG. 6, an exemplary system 600 for creating and managing user-customized financial products according to the present disclosure is shown. The exemplary system 600 comprises one or more computing devices 601-607 in communication with each other, via, for example, a wired or wireless communications network 609. Each computing device 601-607 comprises a memory for storing instructions, at least one processor for executing instructions, and means for communicating (i.e., sending and receiving data/information). The computing devices 601-607 may communicate and interact as peers, such as in a peer-to-peer network; or they may communicate in a client-server relationship, such as with one of the devices (e.g., 601) operating as a centralized server that provides data, program functions, security, etc. to the remainder of the group (e.g., 603-607), i.e., the clients. In either scenario, the computing devices 601-607 may reside at a single physical location (e.g., at centralized financial entity), or across multiple, physically separated locations (e.g., across one or more financial entities and/or customers' residences).

At least one of the computing devices 601-607 may comprise instructions that when executed, causes the system 600 (via one or more of the devices 601-607) to create a plurality of user-customized financial products, each such product comprising a baseline financial product which itself comprises a combination of one or more underlying product components. These user-customized financial products may include at least one of a certificate of deposit, a market linked certificate of deposit, or any other similar instrument. Each product's underlying product components may comprise one or more customizable component parameters. These parameters, when adjusted, define each product's structure and characteristics.

Devices 601-607 configured to create such customized products may include instructions for creating one or more baseline financial products by combining one or more underlying product components. In one embodiment, at least one of the devices 601-607 may be configured to create different baseline financial products, each comprising a different combination of underlying product components. Once at least one baseline financial product has been created, one or more of the computing devices 601-607 may include instructions for creating one or more user-customized financial products by dynamically adjusting, in response to user-defined input, one or more parameters of at least one of the underlying product components of the at least one of the baseline financial product. Optionally, one or more of the component parameters may be linked to one another such that adjusting a first of the parameters automatically adjusts at least one other parameter.

In one embodiment, at least one computing device 601-607 further comprises a display 613 and instructions for automatically calculating a projected maturity value associated with each user-customized financial product. This calculated maturity value may comprise a minimum guaranteed value and a conditional return value, where the conditional return value is linked to a market index. In such an embodiment, the display 613 may be configured to dynamically display a graphical representation of the projected maturity value that changes as one or more parameters are adjusted via, for example, a user input device. In addition, such a computing device 601-607 may be configured to: a) automatically prepare and display a summary report reflecting one or more adjusted parameters associated with each user-customized financial product; b) receive user input confirming each of said adjusted parameters; and c) issue user-customized financial products in response to user input confirmations.

Once a plurality of user-customized financial products has been created, one or more of the computing devices 601-607 may further comprise instructions for disaggregating the customized products into their respective underlying product components and associated component values; and for aggregating all component values associated with each of the underlying product components. As noted above, the user-customized products may be created via one computing device (e.g., 601), or across multiple computing devices (e.g., 601-607). As a result, one or more of the computing devices 601-607 may perform the foregoing disaggregation and/or aggregation functions. Moreover, these functions may be performed at predetermined times, or in real-time.

In one embodiment, each underlying product component comprises one or more component elements (or characteristics) that define a particular financial profile that is common to other underlying product components. As discussed above, having a common financial profile is what enables aggregation of the underlying product component values. Thus, the component elements of one or more product components that comprise at least one baseline financial product may be associated, and then divided into tenor elements and baseline product-specific elements. Examples of tenor elements may include, without limit: present value of money, interest rate factor, capital guarantee limits, periodic payment limits, sum of interest payment values, frequency, and number of payments; and example baseline product-specific elements may include: tenor, base parameter, dynamic texts, return tables, and conditional return values.

Following at least one aggregation of component values, at least one of the computing devices 601-607 may include instructions for executing at least one hedging transaction to hedge the aggregated component value of at least one of the underlying product components. Such hedging transactions may be triggered manually or automatically according to predetermined criteria. For example, in one embodiment, one or more of the computing devices 601-607 may be configured to monitor underlying component volumes as they accumulate due to the creation of user-customized products, and to monitor market values (or prices). In such an embodiment, the system 600 may include an optional market database 611 in communication with at least one computing device 601-607 for providing real-time market data (including pricing quotes, for example) relating to one or more underlying product components; and the one or more computing devices 601-607 may include instructions for monitoring market values associated with the one or more underlying components. If the market values and/or component volumes reach a predetermined level, one or more of the computing devices 601-607 may automatically execute at least one hedging transaction. Alternatively, a hedging transaction may be triggered when the market values yield a predetermined margin.

Optionally, one or more of the computing devices 601-607 may comprise instructions for executing certain post-hedging operations. In one embodiment, for example, at least one such device 601-607 may include instructions that when executed, cause the system 600 to receive settlement details (in response to executing one or more hedging transactions), and to assign a component settlement amount, based on the settlement details, to each underlying product components of at least one baseline financial product. In addition, such device(s) 601-607 may be configured to aggregate said component settlement amounts, by baseline financial product, to determine a baseline product settlement amount for a particular baseline financial product; and to proportionally disaggregate the baseline product settlement amount across each user-customized financial product created therefrom to determine, for each user-customized financial product, a user-settlement amount. Once the user-settlement amount(s) are determined, the computing device(s) 601-607 may include instructions for automatically transmitting the user-settlement amount(s) to one or more financial entities (each comprising one or more computing devices), and automatically applying a user-settlement amount to its corresponding user-customized financial product.

Although the systems and methods have been described in connection with specific forms thereof, it will be appreciated that a wide variety of equivalents may be substituted for the specified elements described herein without departing from the spirit and scope of this disclosure as described in the appended claims.

What is claimed is:

1. An electronic method of managing a plurality of user-customized financial products via a computing device, comprising:
    creating, via the computing device, a plurality of user-customized financial products, each a discrete financial instrument comprising a baseline financial product comprised of a combination of one or more underlying product components, said underlying product components each comprising one or more user-customized component parameters;
    disaggregating each of the plurality of user-customized financial products into their respective underlying product components and associated component values;
    aggregating all component values associated with each of the underlying product components;
    automatically executing at least one back-to-back hedging transaction for the aggregated component value of at least one of the underlying product components.

2. The method of claim 1, wherein creating at least one of the plurality of user-customized financial products comprises:
    receiving in the computing device market data relating to the one or more underlying product components;
    combining the one or more underlying product components based on said market data to create at least one baseline financial product that yields a minimum desired margin; and
    customizing the at least one baseline financial product by dynamically adjusting one or more parameters associated with at least one of the underlying product components,
    wherein adjusting a first parameter associated with at least one of the underlying product components automatically adjusts at least one other underlying product component parameter.

3. The method of claim 2, wherein the parameters associated with the underlying product components comprise one or more of an initial deposit amount, a maturity term, minimum guaranteed return, number and frequency of periodic cash payouts, minimum annual percentage yield (APY) rate, a source of conditional returns, and participation in conditional returns.

4. The method of claim 2, further comprising:
automatically calculating a projected maturity value associated with each user-customized financial product;
dynamically displaying a graphical representation of the projected maturity value that changes as one or more product component parameters are adjusted;
automatically preparing and displaying a summary report reflecting all adjusted parameters of each user-customized financial product;
confirming each of said adjusted parameters; and
issuing each of said user-customized financial products.

5. The method of claim 1, wherein each underlying product component comprises one or more component elements that define a common financial profile that enables aggregation of said underlying product component values, the method further comprising:
associating all component elements of the one or more underlying product components that comprise each baseline financial product; and
dividing said associated component elements into tenor elements and baseline product-specific elements,
said tenor elements comprising one or more of a present value of money, interest rate factor, capital guarantee limits, periodic payment limits, sum of interest payment values, frequency, and number of payments, and
said baseline product-specific elements comprising one or more of a tenor, base parameter, dynamic texts, return tables, and conditional return values.

6. The method of claim 1, wherein the plurality of user-customized financial products are created across multiple financial entities,
said disaggregating and aggregating steps occurring across said multiple financial entities.

7. The method of claim 1, wherein at least two of the plurality of the user-customized financial products are comprised of different baseline financial products, each comprised of different combinations of underlying product components.

8. The method of claim 4, wherein the calculated maturity value comprises a minimum guaranteed value and a conditional return value, wherein the conditional return value is linked to a market index.

9. The method of claim 1, wherein at least one of the user-customized financial products comprises at least one of a certificate of deposit and a market linked certificate of deposit.

10. The method of claim 1, wherein the underlying product components comprise one or more of a derivative, interest rate swap, maturity swaps, options, and annuities.

11. The method of claim 1, further comprising:
automatically executing at least one back-to-back hedging transaction for the aggregated component value of each underlying product component of at least one baseline financial product;
receiving settlement details in response to executing the at least one hedging transaction;
assigning a component settlement amount, based on the settlement details, to each of the underlying product components that comprise the at least one baseline financial product;
aggregating said component settlement amounts, by baseline financial product, to determine a baseline product settlement amount for said at least one baseline financial product;
proportionally disaggregating the baseline product settlement amount across each user-customized financial product created from the at least one baseline financial product to determine, for each user-customized financial product, a user-settlement amount;
automatically transmitting one or more user-settlement amounts to one or more financial entities; and
automatically applying each user-settlement amount to its corresponding user-customized financial product.

12. A system for creating and managing user-customized financial products, comprising:
one or more computing devices in communication with each other, each comprising a memory for storing instructions and at least one processor for executing said instructions, at least one of said computing devices executing instructions causing the system to perform the steps of:
creating, via the computing device, a plurality of user-customized financial products, each a discrete financial instrument comprising a baseline financial product comprised of a combination of one or more underlying product components, said underlying product components each comprising one or more user-customized component parameters;
disaggregating each of the plurality of user-customized financial products into their respective underlying product components and associated component values;
aggregating all component values associated with each of the underlying product components; and
automatically executing at least one back-to-back hedging transaction for the aggregated component value of at least one of the underlying product components.

13. The system of claim 12, further comprising a market database in communication with the at least one computing device providing real-time market data relating to the one or more underlying product components.

14. The system of claim 12, wherein the at least one computing device further comprises instructions that when executed cause the system to:
disaggregate the user-customized financial products and aggregate all component values associated with each underlying product component in real-time;
monitor market values of at least one of the underlying product components; and
execute the at least one back-to-back hedging transaction when market values of at least one underlying product component yields a predetermined margin in view of the aggregated component value of said at least one underlying product component.

15. The system of claim 12, wherein the at least one computing device further comprises instructions, that when executed cause the system to:
create one or more baseline financial products by combining one or more underlying product components, wherein each baseline financial product comprises a different combination of underlying product components; and
create one or more user-customized financial products by dynamically adjusting, in response to user-defined input, one or more parameters of at least one of the underlying product components of at least one of the baseline financial products, wherein adjustment of a first parameter associated with at least one of the underlying product components automatically adjusts at least one other underlying product component parameter.

16. The system of claim 12, wherein the one or more computing devices are located at multiple physically separate financial entities,
    said computing devices creating a plurality of user-customized financial products at the multiple financial entities, and
    at least one of said computing devices disaggregating the plurality of user-customized financial products and aggregating all component values associated with said plurality of user-customized financial products across all of said multiple financial entities.

17. The system of claim 12, wherein each underlying product component comprises one or more component elements that define a common financial profile that enables aggregation of said underlying product component values, the at least one computing device further comprising instructions that when executed cause the system to:
    associate all component elements of the one or more underlying product components that comprise each baseline financial product; and
    divide said associated component elements into tenor elements and baseline product-specific elements,
    said tenor elements comprising one or more of a present value of money, interest rate factor, capital guarantee limits, periodic payment limits, sum of interest payment values, frequency, and number of payments, and
    said baseline product-specific elements comprising one or more of a tenor, base parameter, dynamic texts, return tables, and conditional return values.

18. The system of claim 12, wherein the at least one computing device further comprises a display, and instructions that when executed cause the system to:
    automatically calculate a projected maturity value associated with each user-customized financial product;
    dynamically display a graphical representation of the projected maturity value that changes as the one or more parameters are adjusted;
    automatically prepare and display a summary report reflecting all adjusted parameters associated with each user-customized financial product;
    receive user input confirming each of said adjusted parameters; and
    issue user-customized financial products in response to user input confirmations.

19. The system of claim 18, wherein the calculated maturity value comprises a minimum guaranteed value and a conditional return value, said conditional return value being linked to a market index, and wherein at least one of the user-customized financial products comprises at least one of a certificate of deposit and a market linked certificate of deposit.

20. The system of claim 12, wherein the at least one computing device further comprises instructions that when executed cause the system to:
    automatically execute at least one back-to-back hedging transaction for the aggregated component value of each underlying product component of at least one baseline financial product;
    receive settlement details in response to executing the at least one hedging transaction;
    assign a component settlement amount, based on the settlement details, to each of the underlying product components that comprise the at least one baseline financial product;
    aggregate said component settlement amounts, by baseline financial product, to determine a baseline product settlement amount for said at least one baseline financial product;
    proportionally disaggregate the baseline product settlement amount across each user-customized financial product that is created from the at least one baseline financial product to determine, for each user-customized financial product, a user-settlement amount;
    automatically transmit one or more user-settlement amounts to one or more financial entities; and
    automatically apply each user-settlement amount to its corresponding user-customized financial product.

* * * * *